(12) United States Patent
Chen et al.

(10) Patent No.: US 8,761,392 B2
(45) Date of Patent: Jun. 24, 2014

(54) DIGITAL RIGHTS MANAGEMENT PROTECTION FOR CONTENT IDENTIFIED USING A SOCIAL TV SERVICE

(75) Inventors: Kuang M. Chen, San Diego, CA (US); Petr Peterka, San Diego, CA (US); Rafie Shamsaasef, San Diego, CA (US)

(73) Assignee: Motorola Mobility LLC, Chicago, IL (US)

(*) Notice: Subject to any disclaimer, the term of this patent is extended or adjusted under 35 U.S.C. 154(b) by 1055 days.

(21) Appl. No.: 12/568,787

(22) Filed: Sep. 29, 2009

(65) Prior Publication Data

US 2011/0075841 A1 Mar. 31, 2011

(51) Int. Cl.
*H04N 7/167* (2011.01)
*H04N 21/60* (2011.01)

(52) U.S. Cl.
CPC ..................................... *H04N 21/60* (2013.01)
USPC .............................. 380/200; 705/50; 713/193

(58) Field of Classification Search
USPC ......................................................... 380/200
See application file for complete search history.

(56) References Cited

U.S. PATENT DOCUMENTS

| 7,237,108 | B2 | 6/2007 | Medvinsky et al. |
| 7,243,366 | B2 | 7/2007 | Medvinsky et al. |
| 7,404,082 | B2 | 7/2008 | Medvinsky et al. |
| 7,426,637 | B2 | 9/2008 | Risan et al. |
| 2002/0174354 | A1* | 11/2002 | Bel et al. ........................ 713/193 |
| 2003/0135464 | A1* | 7/2003 | Mourad et al. ................... 705/50 |
| 2004/0139335 | A1 | 7/2004 | Diamand et al. |
| 2005/0071881 | A1 | 3/2005 | Deshpande |
| 2005/0108519 | A1 | 5/2005 | Barton et al. |
| 2007/0157252 | A1 | 7/2007 | Perez |
| 2007/0244903 | A1* | 10/2007 | Ratliff et al. ..................... 707/10 |
| 2008/0059989 | A1 | 3/2008 | O'Connor et al. |
| 2008/0098212 | A1 | 4/2008 | Helms et al. |
| 2008/0229205 | A1 | 9/2008 | Lee et al. |
| 2008/0301750 | A1 | 12/2008 | Silfvast et al. |
| 2008/0313541 | A1 | 12/2008 | Shafton et al. |
| 2009/0049118 | A1 | 2/2009 | Stevens |
| 2010/0242074 | A1 | 9/2010 | Rouse et al. |

OTHER PUBLICATIONS

PCT Search Report & Written Opinion, RE: Application #PCT/US10/48577; Oct. 25, 2010.
Learn-Networking.com, "How Kerberos Authentication Works", website printout pp. 1-11, Jan. 28, 2008.
European Patent Office, "Extended Search Report" for European Patent Application No. 10821014.7 dated Feb. 22, 2013, 9 pages.
"Function Model of a Conditional Access System" EBU Project Group B/CA, 8301 EBU Review Technical (1995) Winter, No. 266, Grand-Saconnex, CH, 14 pages.

* cited by examiner

*Primary Examiner* — Carl Colin
*Assistant Examiner* — Syed Zaidi (57) ABSTRACT

A method is provided for viewing a bookmarked video clip. The method includes establishing communication over a broadband network with a first network element on which at least one bookmark resides. The bookmark includes metadata identifying a bookmarked video clip of a video program and specifies a network address at which the bookmarked video clip is located. Upon user request, metadata associated with a specified bookmark is received. Communication is established with a second network element on which the specified bookmarked video clip is located using the network address of the specified bookmarked video clip provided in the metadata. The bookmarked video clip is received from the second network element. The bookmarked video clip is encrypted in accordance with a digital rights management scheme. The bookmarked video clip is decrypted and rendered.

11 Claims, 6 Drawing Sheets

DIGITAL RIGHTS MANAGEMENT PROTECTION FOR CONTENT IDENTIFIED USING A SOCIAL TV SERVICE

FIELD OF THE INVENTION

The invention relates generally to systems and methods for bookmarking and sharing video clips and the like among users, and more particularly to systems and methods for bookmarking and sharing video clips and the like among users while protecting the digital rights of the content providers of such video clips.

BACKGROUND OF THE INVENTION

Social TV services have recently been proposed in which users can store, share and discover bookmarks that point to multimedia clips taken from television and other video programming. The bookmarks, which can be created and shared through a user's set top box or other client device, are analogous to web-based social bookmarks that are offered by on-line services such as del.icio.us, for example. Such social TV services allow users to share clips from programs with friends and tag bookmarks for easy access. Users gain information on what friends are interested in and the producers of the tagged or bookmarked programs gain information about their viewers.

The bookmarked clips are usually short segments of video taken from a program such as a news or sporting event, a broadcast television series, a theatrical film and the like. A bookmarked clip is usually available on-demand. The creator of a bookmark may be able to tag each of their bookmarks with freely chosen index terms. The bookmarks that are posted by a user may be publicly viewable or they may be marked as private so that they are only available to selected viewers such as friends of the user who created the bookmark. Such friends may be defined by "buddy lists" and the like.

In one scenario, Mary is watching a program that she is recording on a DVR associated with her set top box. She decides to bookmark a clip of the program using her set top box and send the bookmark to Bob. The bookmark includes a thumbnail still image from the clip, an identifier of the clip and an address such as a URL or other pointer that specifies where the clip may be found. Bob receives the bookmark through his set top box and views the thumbnail image on his television or other display device. If Bob decides to watch the clip he can direct his set top box to access the clip at the address specified in the bookmark. If the DVR on which the clip is stored is incorporated in Mary's set top box, then the address will be the URL of Mary's set top box. On the other hand, if the DVR is a network DVR, the address that is specified in the bookmark will be the URL of the network DVR.

SUMMARY OF THE INVENTION

In accordance with the present invention, a method is provided for viewing a bookmarked video clip. The method includes establishing communication over a broadband network with a first network element on which at least one bookmark resides. The bookmark includes metadata identifying a bookmarked video clip of a video program and specifies a network address at which the bookmarked video clip is located. Upon user request, metadata associated with a specified bookmark is received. Communication is established with a second network element on which the specified bookmarked video clip is located using the network address of the specified bookmarked video clip provided in the metadata. The bookmarked video clip is received from the second network element. The bookmarked video clip is encrypted in accordance with a digital rights management scheme. The bookmarked video clip is decrypted and rendered.

In accordance with another aspect of the invention, a method is provided for sharing a video clip with a third party. The method includes receiving user input identifying a video clip from a program obtained over a broadband access network and causing the identified video clip to be stored in an encrypted form. A bookmark is created which includes metadata identifying the video clip and specifying a network address at which the bookmarked video clip is located. The bookmark is posted on a server so that it is accessible to selected third parties over a communications network.

DETAILED DESCRIPTION

One problem that arises from the growing availability and use of social TV services is that once a program clip has been bookmarked it is no longer under the control of the content owner and thus the clip may be freely disseminated without the content owner's approval or authorization. Since bookmarked clips may only represent a small portion of an entire program, it may be thought that the free dissemination of a single clip does not adversely impact the authorized distribution of the complete program. In fact, the content owner may view the dissemination of such a clip as advertising that may increase demand for authorized copies of the complete program. However, it is conceivable that a user could bookmark a series of clips that represent the entirety of a program, which would decrease demand for authorized copies of the program, thereby decreasing the content owner's potential revenue. Moreover, for a variety of other reasons the content owner may not wish to freely disseminate even short clips of its programming. For instance, the content owner may wish to tightly control dissemination of a clip that discloses a surprise ending to a program.

As detailed below, the aforementioned problem may be overcome by employing a digital rights management (DRM) scheme in which the clips are encrypted so that they can only be decrypted by authorized users or devices. In this way unauthorized use and distribution of the clips can be prevented.

Figure 1:
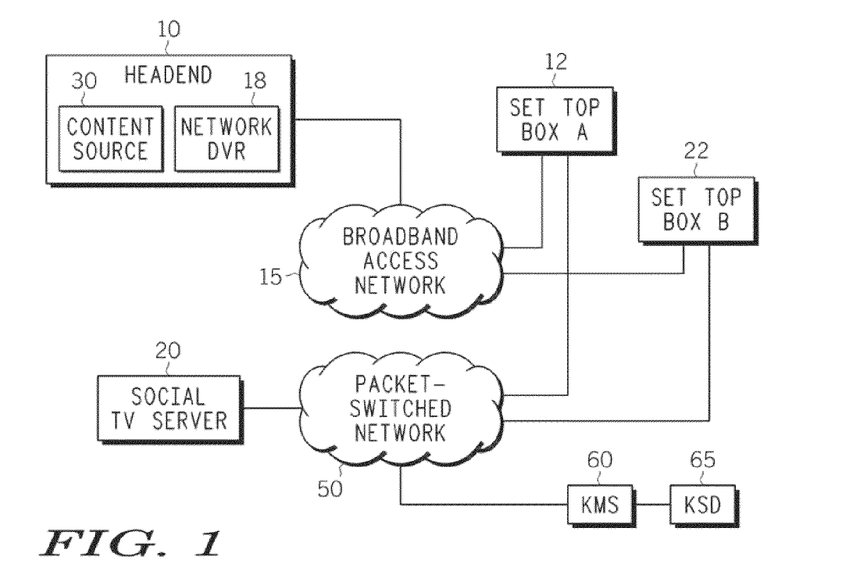
FIG. 1 shows a block diagram of one example of an operating environment in which a social TV service may be offered to subscribers associated with client devices such as set top boxes.

FIG. 1 shows a block diagram of one example of an operating environment in which a social TV service may be offered to subscribers associated with client devices such as set top boxes 12 and 22. The client devices communicate with a number of network elements over one or more networks. For instance, a headend 10 is in communication with the client devices 12 and 22 over a broadband access network 15. The headend 10 is the facility from which a network operator transmits programming content and provides other services over the network. The Broadband access network 15 and headend 10 are typically provided by an MSO (Multi-Service Operator). The broadband access network 15 may be a cable data network such as an all-coaxial or a hybrid-fiber/coax (HFC) network. Of course, other broadband access networks such as xDSL (e.g., ADSL, ADLS2, ADSL2+, VDSL, and VDSL2) and satellite systems may also be employed. In some implementations broadband access network 15 may alternatively comprise, for example, a packet-switched network that is capable of delivering IP packets directly to the set top boxes 12 and 22 using, for example, a cable data network, PON, or the like.

As shown in FIG. 1, headend 10 can include a network DVR 18 that stores content for subsequent transmission to a set top box in response to user request. The network DVR 18 provides the subscriber with the functionality that is typically available when a subscriber employs a local DVR. The content may be provided to the network DVR from any available content source, including, for example, content source 30.

Client devices 12 and 22 are in communication with a social TV server 20 over a public or privately-operated packet-switched network 50. For purposes of illustration the packet-switched network 50 is depicted as operating in accordance with the Internet Suite of protocols and thus for convenience from time to time will be referred to herein as the Internet. Those skilled in the art will recognize and understand that although broadband access network 15 and packet-switched network 50 are depicted in FIG. 1 as physically distinct networks, in some cases these networks may share infrastructure and other resources in whole or in part. That is, the depictions of broadband access network 15 and packet-switched network 50 in FIG. 1 may be viewed as logically distinct networks rather than physically distinct networks. For instance, an HFC network may be used to support the delivery of IP packets, in which case networks 15 and 50 may be the same. Likewise, in an IPTV implementation, networks 15 and 50 may be the same. Conversely, in some implementations each of the networks 15 and 50 may include multiple, distinct networks that have no physical connection with one another.

Social TV server 20 or other network element is employed to create, store and maintain bookmarks at the request of users. The server 20 also posts the bookmarks so that they are available to other authorized users. In some implementations the social TV server 20 may be associated with the MSO or other network service provider that delivers programming and other content to the users over the broadband access network 15. In this case the social TV server 20 may be located in the headend 10. An arrangement showing such an implementation will be discussed below in connection with FIG. 6. In other implementations, however, the social TV server 20 may be operated by a third party that delivers the bookmarks to authorized users over the packet-switched network 50 as, for instance, a cloud-based service.

Figure 2:
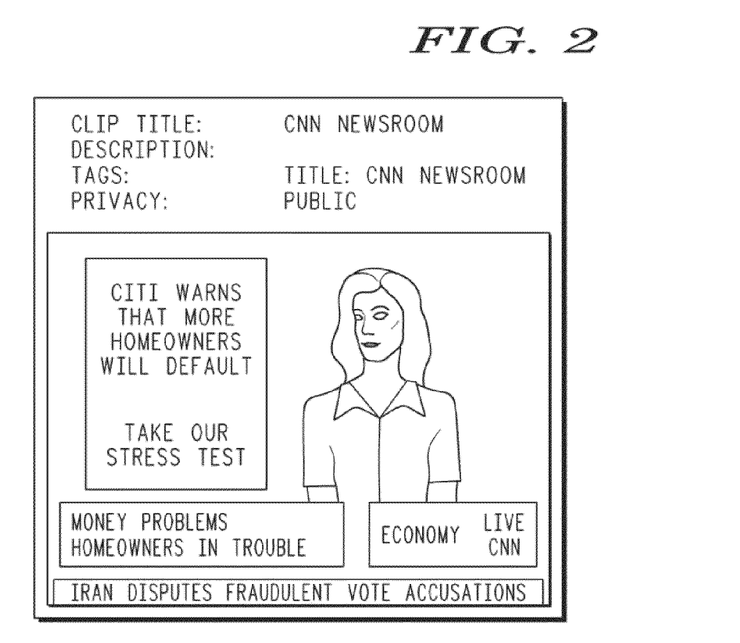
FIG. 2 shows one example of a social TV bookmark that identifies segments or clips of a program or other content.

The bookmarks posted by the social TV server 20 identify segments or clips of a program or other content that the user has received from the headend 10. FIG. 2 shows one example of such a bookmark. As shown, bookmark includes a thumbnail still image from the clip or segment that the user has decided to bookmark. The bookmark may also include metadata concerning the clip that is being bookmarked. Such metadata may include, for example, a clip title and a description as well as tags that permit the user to characterize the content of the clip using pre-specified or free form words or expressions. The bookmarks also include a privacy level that is specified by the user. In this example, the privacy level is denoted "public," which means that the bookmark is made available to anyone who is authorized to access the social TV service. In other examples the privacy level may limit access to the bookmark to specified individuals or groups of individuals specified in a buddy list or the like.

The bookmark also includes a network address such as a Universal Resource Locator (URL) at which the clip may be found. In some implementations the bookmark may include a hyperlink in which the network address is embedded. The hyperlink will direct or navigate the user to the location of the clip. For instance, the thumbnail image may serve as the anchor of the hyperlink so that when a user "clicks" on other otherwise activates the anchor the user will be navigated to the clip. In the example shown in FIG. 1 the clip resides on the network DVR 18 and thus the hyperlink will navigate the user to network address of network DVR 18. The bookmark also denotes the start time and end time of the clip. These times may be specified using any appropriate timestamp such as a start frame and an end frame of the clip. The start time and end time of the clip are derived from user inputs that are received when the bookmark is created.

As previously mentioned, a digital rights management (DRM) scheme is provided for use with the social TV service so that bookmarked clips are encrypted to prevent their unauthorized use and distribution. The DRM scheme may employ encryption and decryption keys, which are parameters used by encryption and decryption algorithms, respectively. Deploying incorrect keys produces different results during both encryption and decryption. While the DRM scheme may employ public (i.e., asymmetric) key cryptography or secret (i.e., symmetric) key cryptography, for purposes of illustration the DRM scheme will be depicted herein as employing secret or symmetric key cryptography. The DRM system may also enforce access and copy protection rules specified by the content owner or service provider, such as (1) view only, no copy, (2) time-limited copy, (3) unlimited copy, (4) single copy with no further redistribution, etc.

Referring again to FIG. 1, a key management server (KMS) 60 is employed as a trusted third party that requires a user who wishes to view a bookmarked clip to prove his or her identity before providing access to an appropriate decryption key. Once the KMS 60 authenticates the user and/or verifies the user's entitlement credentials, the KMS 60 retrieves the appropriate key from a key storage device (KSD) 65 and delivers it to the user's client device. In the example of FIG. 1 the KMS 60 may be associated with either the social TV service provider and/or the network service provider (e.g., an MSO) that delivers programming and other content to the users over the broadband access network 15. The KMS 60 may or may not be co-located with the social TV server 20, provided that it can communicate with the social TV server 20. In the implementation shown in FIG. 1, the KMS 60 is remotely located from the social TV server 20 and communicates therewith over packet-switched network 50. If the KMS 60 is associated with the network service provider, it may be located in the headend 10.

In those implementations in which the KMS 60 is associated with the social TV service provider, the social TV service provider can presumably authorize users to access bookmarked clips on the behalf of the content owner. Likewise, in those implementations in which the KMS 60 is associated with the network service provider, the network provider can presumably authorize users to access bookmarked clips on the behalf of the content owner. As the content may be encrypted on the network DVR 18, the encryption function associated with the DVR must also communicate with the key storage device 65 or the KMS 60 to obtain the symmetric encryption keys. Encryption may be performed before the content is stored on the network DVR (pre-encryption) or when it is streamed to the settop box 12 or 22 (real-time encryption).

Figure 3:
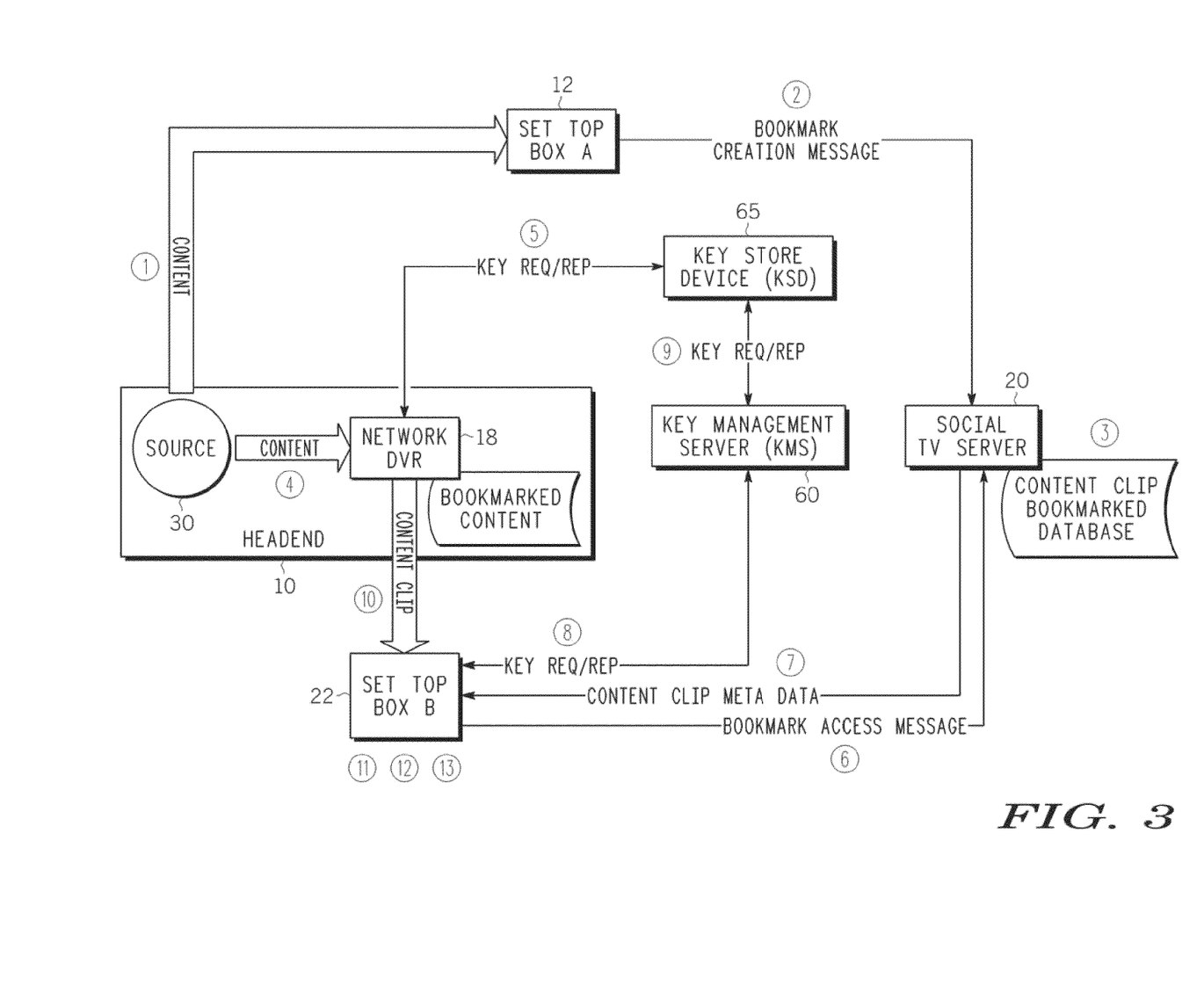
FIG. 3 is a message flow diagram illustrating the messages that are transmitted between the various network nodes shown in FIG. 1 when a first user creates a bookmark for a video clip stored on a network DVR and a second user views the clip that the first user has bookmarked.

FIG. 3 is a message flow diagram illustrating the messages that are transmitted between the various network nodes shown in FIG. 1 when a first user creates a bookmark and a second user views the clip that the first user has bookmarked. In FIGS. 1 and 3, as well as the figures that follow, like elements are denoted by like reference numerals. In these examples client devices 12 and 22 will be referred to as a set top box. Of course, either or both of the client devices 12 and 22 may be any other suitable device such as a PC, PDA or a mobile device such as a mobile telephone.

As indicated at message 1, the first user's set top box 12 or other client device is receiving programming content from headend 10. In addition, the programming content is being recorded and stored on the network DVR 18. While the first user is viewing the content (either as it is received from the content source 30 in the headend 10 (i.e. real-time or live viewing) or as it is being played back on the network DVR 18 (i.e. time shifting)) and decides to bookmark a segment or clip of interest at 2, the user inputs an indication that the beginning of the clip has been reached. For instance, the user might press a button on a remote control unit or keyboard or click a mouse button. In response to the user input the set top box 12 notes start time of the clip. If the start time is defined in terms of a start frame, the start frame will typically be the current frame that is being displayed or the nearest I frame. When the clip ends the user inputs an indication that the end of the clip has been reached. In response to the user input the set top box 12 notes an end time of the clip. If the end time is also defined in terms of an end frame, the end frame will typically be the current frame that is being displayed or the nearest I frame. After the clip has been defined in this manner the first user may add metadata such as a clip title and description. Alternatively, or in addition thereto, once it receives the bookmark, the social TV server 20 may add metadata by accessing external databases such as an electronic program guide (EPG), for instance. Once the user has completed the bookmark, the bookmark is uploaded to the social TV server 20 at 3. The social TV server 20 saves the bookmark with a unique identifier. The bookmark may also identify the user who created the bookmark.

As indicated at message 4, the programming content is encrypted by the network DVR 18 as it is being recorded and stored, along with any usage rights associated therewith. A symmetric key is used during the content encryption process. The programming content is assigned a unique identifier when it is stored on the network DVR 18. At 5 the network DVR 18 or other network element associated with the headend 10 sends a key request transaction to the key storage device 65. The key request transaction includes the unique identifier of the content and the symmetric key as well as any content access rules that may limit the manner in which the content can be used. For instance, one content access rule may prevent the authorized user from burning the clip to a DVD or from otherwise further distributing the clip to other parties. Another content access rule may specify a time at which the symmetric key expires so that the bookmarked clip can no longer be viewed. Alternatively, the key storage device 65 may create the content encryption key and/or the content access rules. It is the DRM system employed for this purpose that determines the details of these transactions. In one particular implementation, a proprietary DRM system may be used, such as the Internet Protocol Rights Management (IPRM) system available from Motorola. Alternatively, other standard or proprietary DRM systems suitably configured or modified may be used.

At this point in the process the creation of the bookmark is complete. A second user who discovers the bookmark on the social TV server 20 may access the clip in the manner described below.

Continuing with message 6 in FIG. 3, the second user identifies, via set top box 22, a bookmarked clip on the social TV server 20 that he or she would like to view. Generally the second user will have registered with the social TV service to order to gain access to the bookmarks. The user may be identified by her/his user name and password associated with the Social TV service. Alternatively, the DRM identity may be used to identify the user to the Social TV service. Once the second user has gained access to the server 20, he or she will be able to access those bookmarks having a security level identified as public or those which include the second user on their distribution list of authorized users. After identifying the desired bookmarked clip the user sends a request to view the clip.

In response to the second user's request, the social TV server 20, at 7, sends the necessary metadata needed to locate the clip. Typically this will include the network address at which the clip is located and the identifier of the clip assigned by the network DVR 18 when storing the clip. At 8 the second user's set top box 22 contacts the KMS 60 (typically over the packet-switched network shown in FIG. 1) and identifies the clip it wishes to access. The KMS 60 verifies that the second user is entitled to access the clip. For instance, the KMS 60 may verify that the second user is subscribed to the social TV service. Once the second user's entitlement credentials have been verified, the KMS 60 may retrieve the symmetric key and associated content access rules from the key storage device 65 at 9 and deliver them to the second user's set top box 22. In some cases the KMS 60 and the set top box 22 may perform a more complex authentication process in accordance with any of a variety of different key management protocols. For instance, in some implementations the well-established Kerberos protocol may be employed, in which tickets are exchanged between the KMS 60 and the second user's set top box 22. If Kerberos is employed, another entity referred to as the Key Distribution Center (KDC) may be used for provisioning and authentication. The KDC is logically, and perhaps physically, divided into an authentication server and a ticket-granting server. The KDC may be a separate server or may be co-hosted with the KSD 65. In other implementations, instead of a Kerberos protocol, another key management protocol that may be employed and which also uses tickets is shown in U.S. Pat. No. 7,243,366, which is hereby incorporated by reference in its entirety. In this implementation, a KDC may be co-hosted with the KSD 65 or it may be deployed as a stand-alone server.

The set top box 22 next establishes a communication session with the network element on which the desired clip is located, which in this case is the network DVR 18, and at 10 the network element begins streaming the encrypted content to the set top box 22. The set top box 22 loads its decryption engine with the symmetric key it received from the KMS 60. The set top box 22 also configures its output devices in accordance with the protection level specified by any copy protection rules that may have been included with the content access rules that were received along with the symmetric key. Finally, the set top box 22 decrypts the clip so that it may be viewed by the second user.

As previously mentioned, in some cases the KMS 60 may be associated with the MSO or other network service provider that delivers programming and other content to the users over the broadband access network 15. In these cases the KMS 60 may be incorporated in the headend 10. Furthermore, the KMS 60 may even be directly incorporated into the network DVR 18. In this latter case the second set top box 22 may navigate directly to the network DVR 18 to obtain both the encrypted clip and the key needed to decrypt the clip. In addition, if the KMS 60 is physically incorporated into the network DVR, the secure key storage device may be eliminated by associating the secure key storage function with the network DVR 18 directly.

The implementations discussed above all assume that the bookmarked clip was stored on a network DVR 18. In some cases however, the clip may be stored by the user who creates the clip in a local storage medium associated with the user's client device. For instance, if the client device is a set top box, the set top box may be equipped with a DVR on which the clip may be stored. The DVR may be a hard disk internal to the set top box or an external hard disk attached to set top box In this case, which will be illustrated in connection with FIG. 4, a second user who wishes to view the clip will navigate to the set top box on which the clip is stored.

Figure 4:
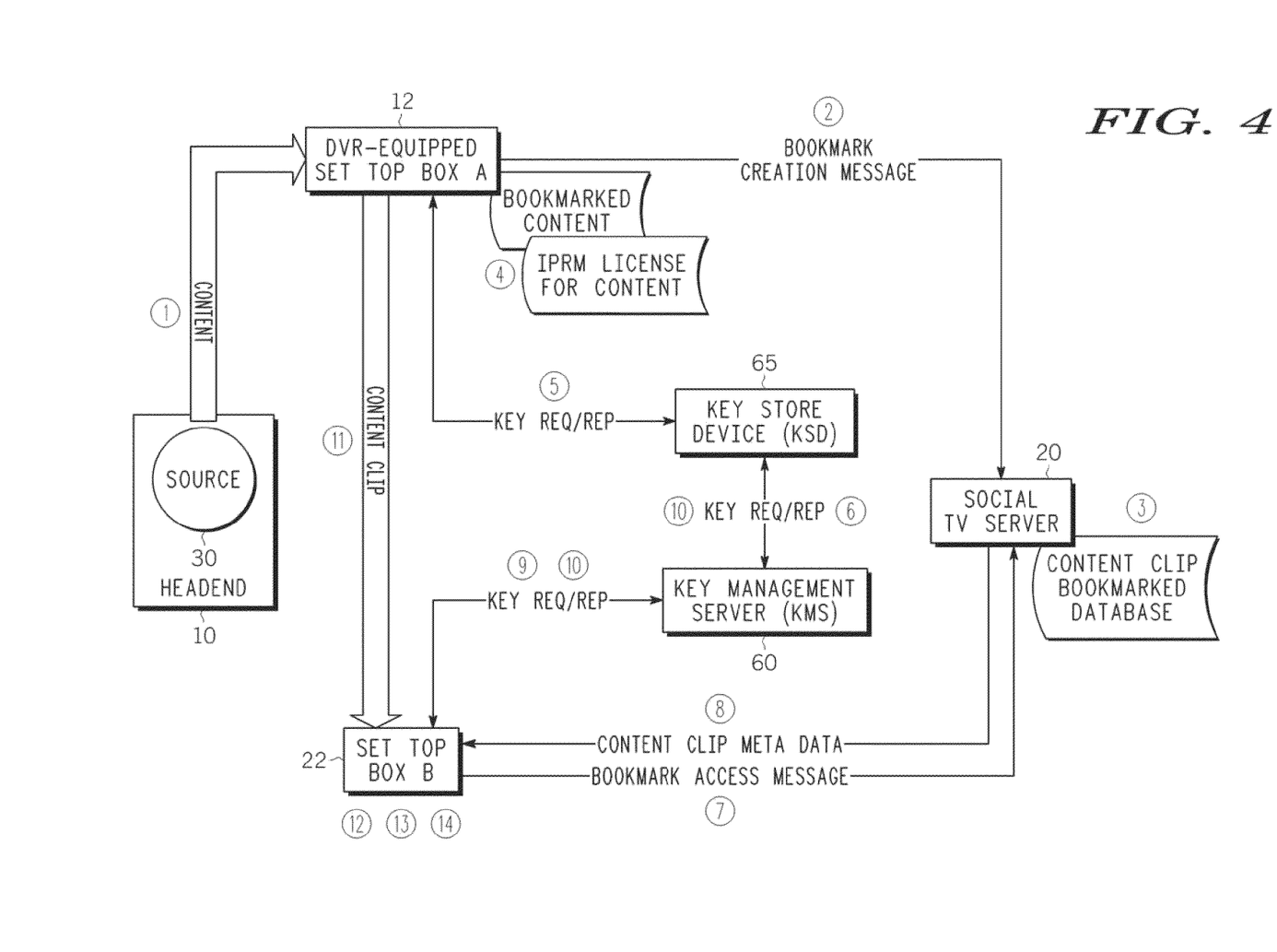
FIG. 4 is a message flow diagram illustrating the messages that are transmitted between the various network nodes shown in FIG. 1 when a first user creates a bookmark for a video clip stored on a local DVR and a second user views the clip that the first user has bookmarked.

Referring to FIG. 4, at 1, 2 and 3, respectively, a first user receives programming from headend 10 on set top box 12, creates a bookmark of a particular clip in the program and saves the bookmark on the social TV server in manner described above in connection with FIG. 3. As indicated at 4 the set top box 12 is also recording the programming on its local DVR. The recorded programming is encrypted using a locally generated encryption key. The encryption key and the associated content access rules are sent to the KMS 60 as part of a key request and key reply transaction at 5. The KMS 60 stores the encryption key and the content access rules in the key storage device KSD 65 at 6.

At this point in the process the creation of the bookmark is complete. A second user who discovers the bookmark on the social TV server 20 may access the clip in the manner described below, which is similar to process discussed above in connection with FIG. 3. In particular, at 7, the second user identifies, via set top box 22, a bookmarked clip on the social TV server 20 that he or she would like to view. After identifying the desired bookmarked clip the user sends a request to view the clip.

In response to the second user's request, the social TV server 20, at 8, sends the necessary metadata needed to locate the clip. In this case the metadata includes the network address of the set top box 12, which is where the clip is located. At 9 the second user's set top box 22 contacts the KMS 60 (typically over the packet-switched network 50 shown in FIG. 1) and identifies the clip it wishes to access. The KMS 60 verifies the entitlement credentials of the second user in the manner described above. At 10, after the second user's entitlement credentials have been verified, the KMS 60 may retrieve the symmetric encryption key and associated content access rules from the key storage device 65 and delivers them to the second users' set top box 22.

The set top box 22 next establishes a communication session with the device on which the desired clip is located, which in this case is the set top box 12, and at 11 the set top box 12 begins streaming the encrypted content to the set top box 22. At 12 the set top box 22 once again loads its decryption engine with the symmetric key it received from the KMS 60 at step 10. The set top box 22 also configures its output devices in accordance with the protection level specified by any copy protection rules that may have been included with the content access rules that were received along with the symmetric key. Finally, the set top box 22 decrypts the clip so that it may be viewed by the second user.

In some implementations the DRM scheme that is employed may utilize the conditional access system that is often used in broadband access networks to limit access to broadcast programming. Since such programming is broadcast, it is transmitted once for receipt by all eligible receivers. Access to the data, however, is conditional, depending, for example, on whether or not a subscription fee has been paid for a specific receiver. Such conditional access to the content is realized by encrypting the information (usually the encryption occurs in the transmitter residing in the headend) under control of an authorization key and by transmitting the encrypted content to the receivers. Furthermore, the decryption keys necessary for the decryption of the content are encrypted themselves and transmitted to the receivers. Usually, symmetrical encryption techniques are used, where the encryption and decryption keys are the same. Only those receivers that are entitled to the content are able to decrypt the decryption key using a first decryptor. The receivers can then decrypt the content using a second decryptor for decrypting the content under control of the authorization key.

Conditional access is provided by conditional access (CA) systems that come as matched sets—one part is integrated into the cable system headend (in a cable broadcast system) and encrypts premium content, the other part provides decryption and is built into the set-top boxes installed in user's homes. Several CA systems are used in the cable industry, including those provided by NDS (Newport Beach, Calif.), Motorola (Schaumberg, Ill.) and Scientific Atlanta (Atlanta, Ga.).

In order for two users to share bookmarked clips using the native conditional access system employed by their MSOs or other broadband service provider, both users must have subscriptions to the programming from which the clip was taken. For instance, if the clip is taken from HBO both users would need to have subscriptions to HBO. Moreover, both users also need to make use of a common conditional access system so that they have access to the same keys and other information necessary to decrypt the content. This will typically be the case if the two users have a common service provider.

In a typical conditional access system the programming content, including for example, video, audio and data components, is encrypted prior to transmission to the subscribers. The encryption process is performed under the control of a control word CW generated by a control word generator in a manner which is well-known per se. The control word CW is an encrypted key that is required to both encrypt and decrypt the content. The control word is incorporated into an Entitlement Control Message (ECM) together with access criteria that identify the service and the conditions required to access the service. For example, the access criteria may specify regional limitations on the broadcast. A further type of message, referred to as an Entitlement Management Message (EMM), which carries details of the subscriber and his or her subscription is also generated. While an ECM message is associated with an encrypted program or a set of programs and carries the information required to decrypt those programs, an EMM message is a message dedicated to an individual user or group of users and carries the information necessary to determine whether those users have the necessary subscriptions in place to be able to view the program.

The encrypted programming, together with the ECM and EMM messages, are generally multiplexed together with other broadcast streams representing other programs, together making up a subscription package from a particular service provider. The package is transmitted to subscribers over the broadcast access network. On receipt at a set-top box, the received data is demultiplexed to extract the required program and its associated ECM and EMM messages. The extracted ECM and EMM messages are sent to a key manager located in the set top box. The key manager uses the ECM and EMM messages to determine whether the subscriber has the right to view the broadcast and if so, to decrypt the control word CW, which is input to a decrypter together with the encrypted broadcast stream to recover the original encoded (e.g, MPEG) programming stream. The encoded stream is then passed to the set top box decoder, which produces an output signal comprising audio, video and data components for display on a display device.

The control word typically comprises a group of random numbers that serves as an encrypted key. The control word may be changed randomly at predetermined intervals A continuous stream of ECM messages is therefore required to decrypt the encrypted signal. The EMM message generally can be updated less frequently than the ECM messages. One format that the ECM and EMM messages may employ is defined in the international standard ISO IEC 13818-1.

Figure 5:
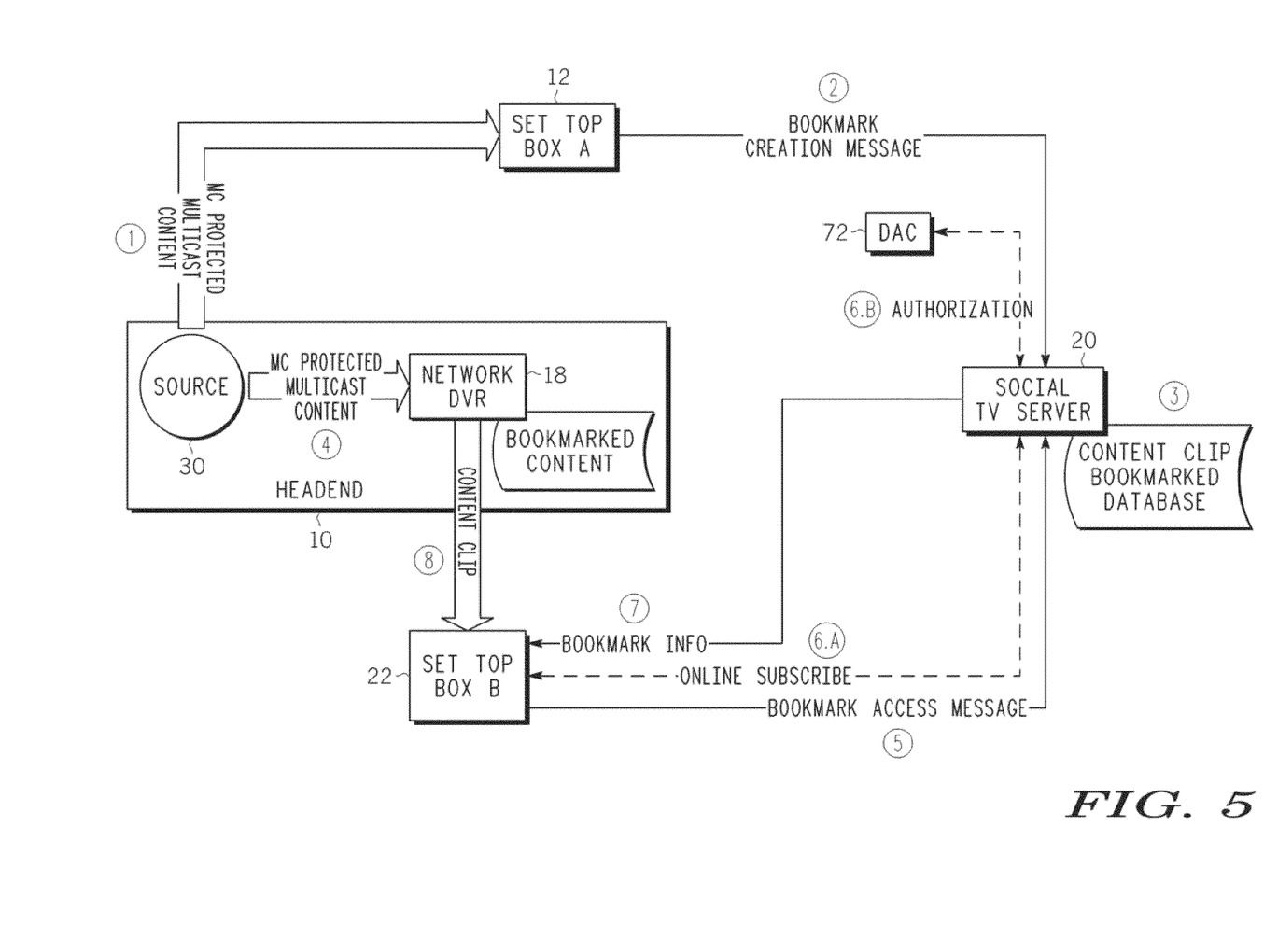
FIG. 5 is a message flow diagram illustrating the messages that are transmitted between the various network nodes shown in FIG. 1 when a first user creates a bookmark and a second user views the clip that the first user has bookmarked and the DRM scheme that is employed is a conditional access system.

FIG. 5 is a message flow diagram illustrating the messages that are transmitted between the various network nodes shown in FIG. 1 when a first user creates a bookmark and a second user views the clip that the first user has bookmarked and the DRM scheme that is employed is a conditional access system.

Referring to FIG. 5, at 1, 2 and 3, respectively, a first user receives programming from headend 10 on set top box 12, creates a bookmark of a particular clip in the program and saves the bookmark on the social TV server 20 in the manner described above in connection with FIG. 3. As indicated at 4 the set top box is also recording the programming on the network DVR 18. The programming received by the set top box 12 and the network DVR 18 is encrypted using the key that is available in the ECM messages. The network DVR 18 records the encrypted content and ECM messages that are multiplexed with the encrypted content. EMM messages are typically received at the time a set top box is authorized for a particular service or periodically thereafter.

The second user discovers the bookmark on the social TV server 20 as described above and requests the clip at 5 using set top box 22. In response to the second user's request, the server 20 optionally may check to see if the second user is authorized to view the view the clip. That is, the server 20 may optionally check to see if the second user subscribes to the programming from which the clip was taken. If the second user does not have a subscription to the service to receive the clip, the social TV server 20 may optionally ask the second user at 6a if he or she wants to subscribe. If so, the social TV server will ask the appropriate digital authorization center (DAC) 72 at 6b to establish a subscription for the second user in a conventional manner. If the second user is not authorized to receive the clip and declines the opportunity to subscribe, the social TV server 20 denies the second user access to the clip and the process terminates.

If, on the other hand, the second user is authorized to receive the clip or in real time subscribes to the necessary service to become authorized to receive the clip, the server 20, at 7, sends the necessary metadata needed to locate the clip. In this case the metadata includes the network address of the network DVR, which is where the clip is located. The second user's set top box 22 contacts the network DVR 18 (typically over the broadband access network 15 shown in FIG. 1) and identifies the clip it wishes to access. At 8 the network DVR 18 begins streaming the clip to the second user's set top box 22. The stream includes the necessary ECM messages. If the set top box 22 has been authorized for the service from which the bookmarked clip originated, it has already received the corresponding EMM. If it is not a subscriber to that service it may either first subscribe to the service or it may receive temporary authorization. In both cases, the DAC 72 sends the corresponding EMM to the set top box 22. Finally, the second set top box 22 receives the stream and decrypts it using the key that is included in encrypted form with the ECM messages The EMM is used to decrypt the key in the ECM.

As previously mentioned, in some implementations the broadband access network 15 may comprise a packet-switched network that is capable of delivering IP packets directly to the set top boxes using, for example, a cable data network, PON, or the like. Programming content that is received through an Internet network connection via the Internet Protocol may be generically referred to as IPTV. IPTV has become a common denominator for systems in which television and/or video signals are distributed to subscribers over a broadband connection using the Internet protocol. In general, IPTV systems utilize a digital broadcast signal that is sent by way of a broadband connection and a set top box that is programmed with software that can handle subscriber requests to access media sources via a television connected to the set top box. A decoder in the set top box handles the task of decoding received IP video signals and converting them to standard television signals for display on the television. When the IP suite is employed, the content is generally transmitted as an MPEG packet stream on a pre-established UDP port and the MPEG packets are encapsulated in UDP/IP datagrams. Other encapsulation protocols such as HTTP or RTP may also be employed.

In IPTV the headend 10 is the facility from which the network operator broadcasts/multicasts/unicasts programming content and provides other services over the broadband access network 15. The headend 10 may include a streaming server for broadcasting/multicasting/unicasting the programming content that is encoded by a real-time encoder. Multicast delivery is particularly suitable for wide distribution of multimedia (video, audio, data) content. On the other hand, unicast delivery is suitable when the streaming server is employed to deliver services such as video-on-demand (VOD) to an individual subscriber. When IPTV is employed, the bookmarked clip may be delivered as a unicast MPEG transport stream similar to the delivery of a VOD program. The set top box receiving the clip may retrieve the appropriate decryption key from the KMS and key storage device in the manner described above.

In some cases the subscriber device receiving the bookmarked clip in the IPTV system is not a set top box or the like but is rather a mobile device such as a mobile telephone. Such mobile devices typically receive transport streams in accordance with the Real Time Protocol (RTP) rather than the MPEG transport protocol. Accordingly, if for instance the streaming server associated with the headend generates a video stream in a format such as H.264, which is then encapsulated in an MPEG-2 transport stream, the MPEG-2 transport stream will need to be torn apart into its individual components and reconstructed to encapsulate them into separate RTP transport streams. To accomplish this, an RTP gateway may be employed to transform the MPEG-2 transport packet provided by the streaming server in the headend into the appropriate RTP transport packets. The original content may also be transcoded during this step to a lower resolution to make it more suitable for a portable device.

Figure 6:
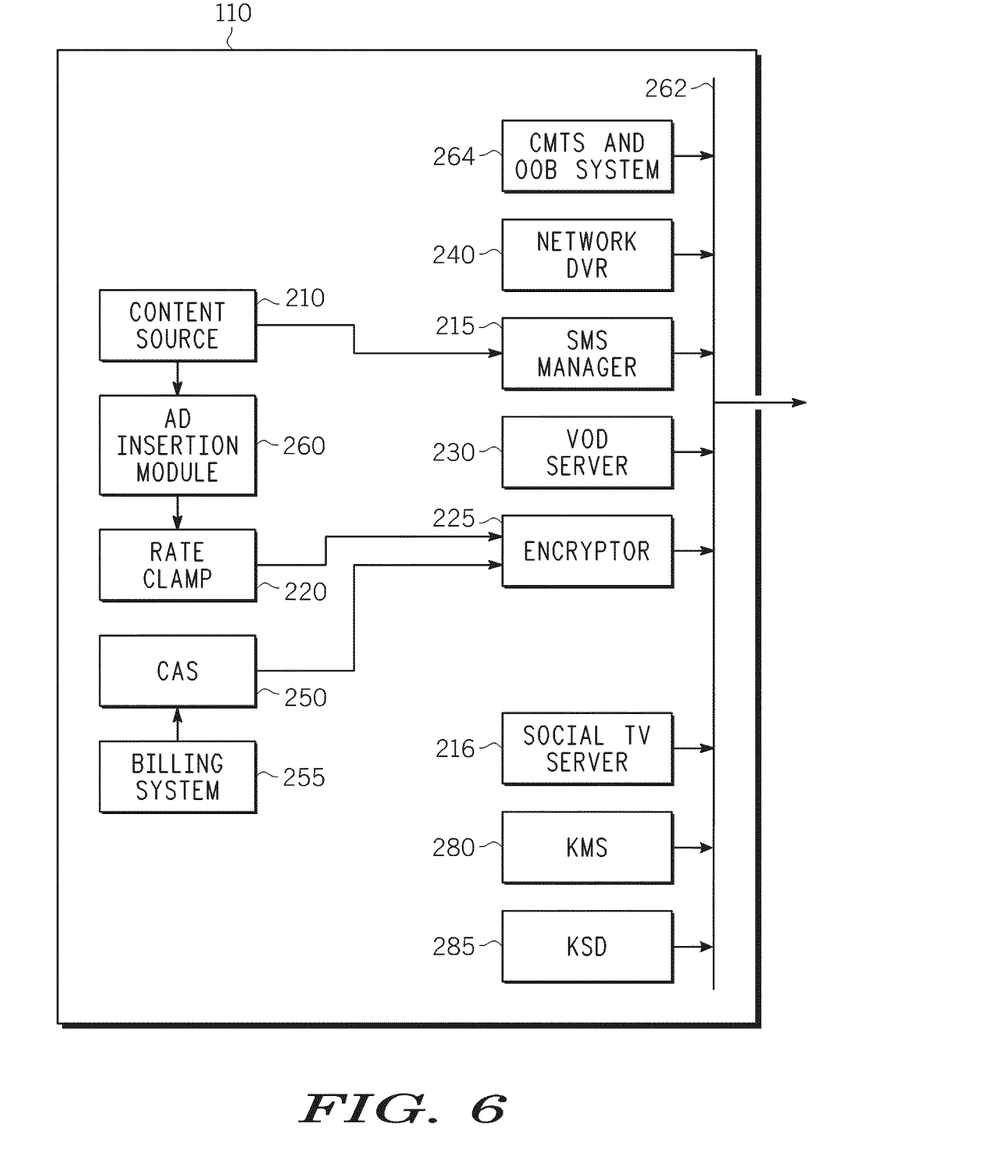
FIG. 6 shows one example of a headend that may incorporate the social TV server depicted in FIG. 1.

As previously mentioned in connection with FIG. 1, in some implementations the social TV server 20 may be associated with the MSO or other service provider. In this case the social TV server 20 may be conveniently located in the headend 10, thereby consolidating such functions as billing and user authorization, for example. One example of such a headend is shown in FIG. 6, The headend 110 shown in FIG. 6 includes a broadcast content source 210, which may include, by way of example, satellite receivers, off-air receivers and/or content storage devices such as servers. Programs are delivered from the content source 210 to one or more encryptors 225 using, for example, IP multicast addressing. The content is then encrypted by the encryptor 225 and transmitted to the broadband access network 15 shown in FIG. 1. Typically, standard definition (SD) channels are currently rate clamped by rate clamp 220 to 3.75 Mbps while high definition channels are currently rate clamped by rate clamp 220 to between about 12 Mbps and 15 Mbps. The encryptors 225 encrypt the digitally encoded content, often under the control of a conditional access system (CAS) 250, which operates in conjunction with a billing system 255. The CAS 250 provides encryption control provisioning parameters such as cryptographic keys to support content encryption. The headend 110 also includes other typical headend components and services such as an advertising insertion module 260 for inserting ads into the content prior to deliver to the encryptors 225, a subscriber management system (SMS) 215 system for coordinating delivery of content to subscribers, a cable-modem termination system (CMTS) and out-of-band (OOB) system 264 and a LAN(s) 262 for placing the various components in data communication with one another.

Headend 110 may also include a variety of other components for offering additional services such as a video on demand (VOD) server 230 and a network DVR 240, for example, which operate under the control of the SMS 215. The VOD server 230 stores programs or other content for distribution to subscribers on an on-demand basis. As previously noted, the network DVR 240 can store content (including, in some cases, the bookmarked video clips) that can be subsequently transmitted to the set top box in response to a user request. Other user input requests are also serviced by network DVR 240, including, for example, requests to accelerate the playing of a program in the forward direction (e.g., cueing) and in the reverse direction (e.g., reviewing). The content may be provided to the network DVR 240 from any available content source, including, for example, content source 210.

The headend 110 also includes social TV server 216 such as social TV server 20 shown in FIG. 1. The social TV server 216 is employed to create, store and maintain bookmarks in the manner described above. The social TV server 216 may employ the CAS 250 as a DRM scheme to prevent bookmarked video clips from being accessed by unauthorized users. Alternatively, or in addition thereto, the headend 110 may also include KMS 280 and KSD 285 for the purpose of providing DRM. KMS 280 and KSD 285 may respectively correspond to the KMS 60 and KSD 65 shown in FIG. 1. It will also be appreciated that the headend configuration depicted in FIG. 6 is a high-level, conceptual architecture and that other headend architectures may also be employed.

Figure 7:
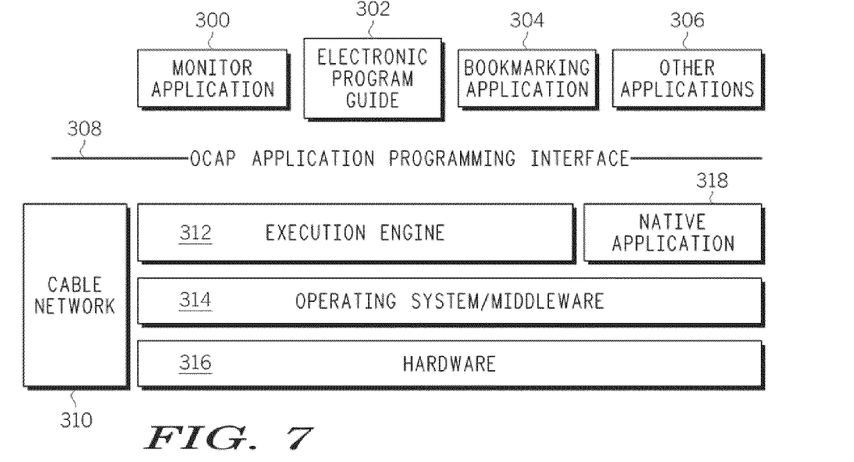
FIG. 7 shows one example of a set-top box such as the set-top boxes depicted in FIG. 1.

FIG. 7 shows one example of the logical architecture of a set-top box such as the set-top boxes depicted in FIG. 1. In this example the set-top terminal is compliant with the OpenCable Application Platform (OCAP) hardware and software environment. The OCAP specification is a middleware software layer specification intended to enable the developers of interactive television services and applications to design such products so that they will run successfully on any cable television system, independent of set-top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set top box is not limited to an OCAP-compliant software/hardware architecture. In other cases, for example, the set top box may be compliant with MHEG, DASE or Multimedia Home Platform (MHP) middleware. Alternatively, the set top box may be based on a proprietary architecture.

Referring to FIG. 7, the top of an OCAP software "stack" includes a Monitor Application 300, Electronic Program Guide (EPG) 302, bookmarking application 304, and any other applications 306 that may be deployed in a particular network, such as a video-on-demand application, for example. The bookmarking application 304 provides the user interface to the social TV service described above. These applications are run on top of a software layer called the "Execution Engine" 312 and interface to the Execution Engine using the well known OCAP APIs 308. The client device may also include certain software applications or "Native Applications" 318 that do not run within the Execution Engine, but directly run on top of the Operating System/Middleware 314 for the client device. Native Applications are typically written for, e.g., a particular hardware configuration 316 of the set top box. Examples of such Native Applications may include management of front panel functionality, remote control interaction, games, and the like.

Figure 8:
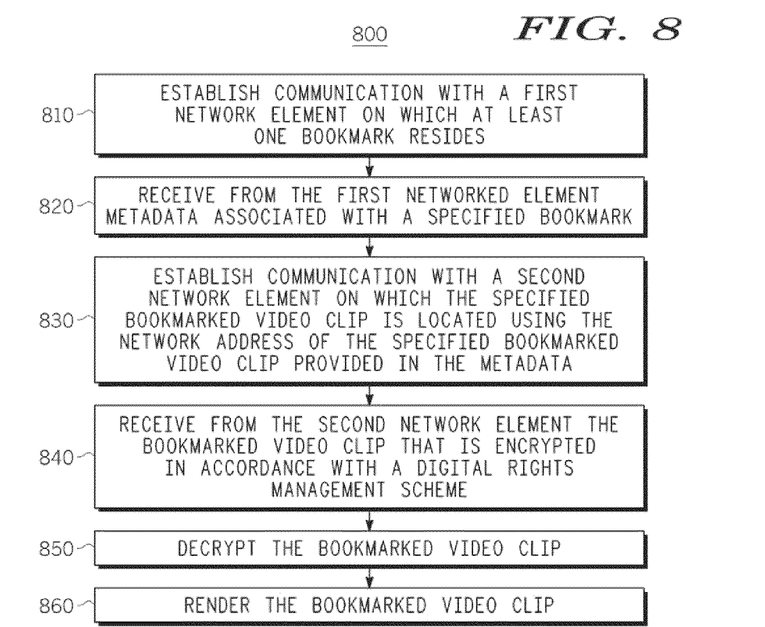
FIG. 8 is a flowchart showing one example of a method employed by a user of a set top box for viewing a bookmarked video clip.

FIG. 8 is a flowchart showing one example of a method 800 employed by a user of a set top box for viewing a bookmarked video clip. The method begins in step 810 by establishing communication over a broadband network with a first network element (e.g., a server) on which at least one bookmark resides. The bookmark includes metadata identifying a bookmarked video clip of a video program and specifies a network address at which the bookmarked video clip is located. Next, at step 820, metadata associated with a specified bookmark is received by the set top box over the broadband network upon user request. The set top box, in step 830, then establishes communication with a second network element on which the specified bookmarked video clip is located using the network address of the specified bookmarked video clip provided in the metadata. The second network element may be, for example, a DVR-equipped set top box, a network DVR or any other networked device capable of storing video clips. The set top box receives the bookmarked video clip from the second network element in step 840. The bookmarked video clip is encrypted in accordance with a digital rights management scheme. The bookmarked video clip is decrypted in step 850 and rendered in step 860.

The processes described above may be implemented in a general, multi-purpose or single purpose processor. Such a processor will execute instructions, either at the assembly, compiled or machine-level, to perform that process. Those instructions can be written by one of ordinary skill in the art following the description herein and stored or transmitted on a computer readable medium. The instructions may also be created using source code or any other known computer-aided design tool. A computer readable medium may be any physical medium capable of carrying those instructions and include a CD-ROM, DVD, magnetic or other optical disc, tape, and silicon memory (e.g., removable, non-removable, volatile or non-volatile).

Although various embodiments are specifically illustrated and described herein, it will be appreciated that modifications and variations of the present invention are covered by the above teachings and are within the purview of the appended claims without departing from the spirit and intended scope of the invention.

The invention claimed is:

1. A method for sharing encrypted bookmarked video clips, the method comprising:
communicating over a network with client devices for receiving bookmarks generated by the client devices, each bookmark identifying a user-selected video clip of a video program, the video clip selected at a respective client device and encrypted with an encryption key identified by each bookmark generating client device to a key management server;
posting at least one bookmark identifying a bookmarked video clip for accessibility by at least one of the client devices, wherein the at least one bookmark specifies a network address of one or more of the client devices at which the video clip, encrypted by the encryption key, is located;
in response to a request over the network from the at least one of the client devices for the at least one bookmark, requesting from the key management server, that verifies the entitlement credentials of the requesting device, a decryption key associated with the requested bookmark for decrypting the bookmarked video clip by the requesting client device; and
providing to the requesting client device the network address of the one or more clients devices at which the encrypted video clip is located.

2. The method of claim 1 further comprising:
presenting entitlement verification credentials to the key management server and identifying the specified bookmarked video clip using a metadata associated with the specified bookmark;
receiving a decryption key from the key management server for decrypting the bookmarked video clip; and
providing the decryption key to the requesting client device.

3. The method of claim 1 wherein the network address is provided to the requesting client device upon verification by the key management server of the entitlement credentials of the requesting client device.

4. The method of claim 1 wherein the client devices sharing encrypted video clips include at least one of a set top box, a home gateway, digital video recorder, or home server.

5. The method of claim 1 further comprising verifying whether the requesting client device is authorized by a content owner of the video program to access the bookmarked video clip.

6. The method of claim 1 further comprising receiving from the key management server, in addition to the decryption key, content access rules that limit use of the decrypted video clip and applying the content access rules.

7. The method of claim 1 wherein verifying the entitlement credentials is performed in accordance with a Internet Protocol Rights Management (IPRM) system.

8. The method of claim 2 wherein presentation of the entitlement verification credentials involves an exchange of tickets.

9. The method of claim 1 wherein a digital rights management scheme is employed, the digital rights management scheme being a conditional access system associated with a broadband access network over which the video clips are shared.

10. The method of claim 9 further comprising receiving at least one entitlement control message along with the video clip, said entitlement control message including the decryption key for decrypting the bookmarked video clip.

11. The method of claim 1 wherein, prior to providing to the requesting client device the network address of the one or more client devices at which the encrypted video clip is located, providing a notification that a subscription to programming from which the video clip is taken is needed to access the video clip, and further comprising obtaining a subscription to the programming.

* * * * *